United States Patent
Coucher

[11] 3,987,937
[45] Oct. 26, 1976

[54] POWDER FEEDER AND METHODS FOR TRANSPORTING PARTICULATE MATERIAL

[75] Inventor: Robert G. Coucher, Salt Lake City, Utah

[73] Assignee: EPPCO, Salt Lake City, Utah

[22] Filed: Feb. 7, 1972

[21] Appl. No.: 223,969

Related U.S. Application Data

[63] Continuation-in-part of Ser. No. 140,838, May 6, 1971, abandoned.

[52] U.S. Cl. .............................. 222/193; 222/330; 302/57
[51] Int. Cl.$^2$ ......................................... B67D 5/54
[58] Field of Search ........... 222/161, 193, 195, 288; 302/57

[56] References Cited
UNITED STATES PATENTS

| | | | |
|---|---|---|---|
| 2,072,845 | 3/1937 | Benoit | 222/195 X |
| 3,387,110 | 6/1968 | Wendler et al. | 302/53 X |
| 3,501,062 | 3/1970 | DeWitt et al. | 222/161 |

FOREIGN PATENTS OR APPLICATIONS

| | | | |
|---|---|---|---|
| 947,479 | 7/1949 | France | 222/193 |
| 1,435,990 | 3/1966 | France | 222/195 |

*Primary Examiner*—Richard C. Queisser
*Assistant Examiner*—Charles Gorenstein
*Attorney, Agent, or Firm*—Trask & Britt

[57] ABSTRACT

A powder feeder, especially useful for transporting particulate materials at very low, yet precisely controlled, rates. A container preferably a closed vessel, is provided with an orifice to admit gas up through the bottom of the vessel in a high velocity column (or jet). A pair of concentric conduits is suspended from the top of the vessel in approximately axial alignment with the orifice so that the column of gas is captured within the outer conduit and substantially all enters the inner conduit. Particulate material (such as metal powder) is stored in the space between the outer conduit and the walls of the vessel. The spacing of the outer conduit from the bottom of the vessel is adjusted to admit particulate material to the vicinity of the orifice at a controlled rate but to prevent flooding of the space between the orifice and the conduits. When gas is forced through the orifice, particulate material is lifted by the venturi pressure effect created by the gas column. Most of the particulate material lifted by the gas column is transported up the inner conduit and out the top of the vessel; the remainder rises up the annular space between the conduits and is spilled out into the interior of the vessel on top of the stored material.

10 Claims, 9 Drawing Figures

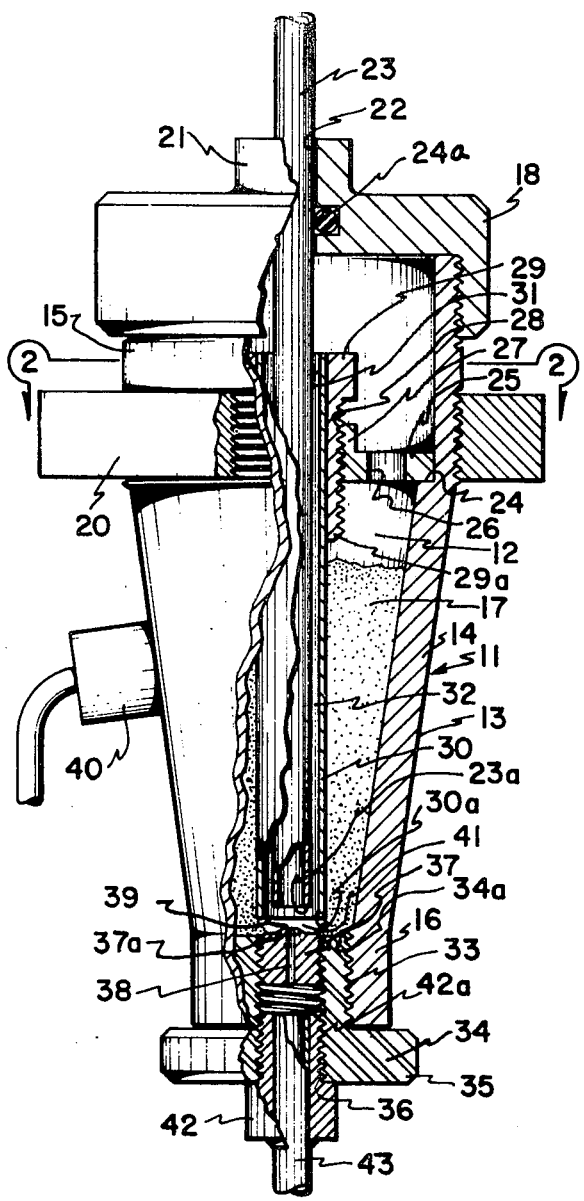
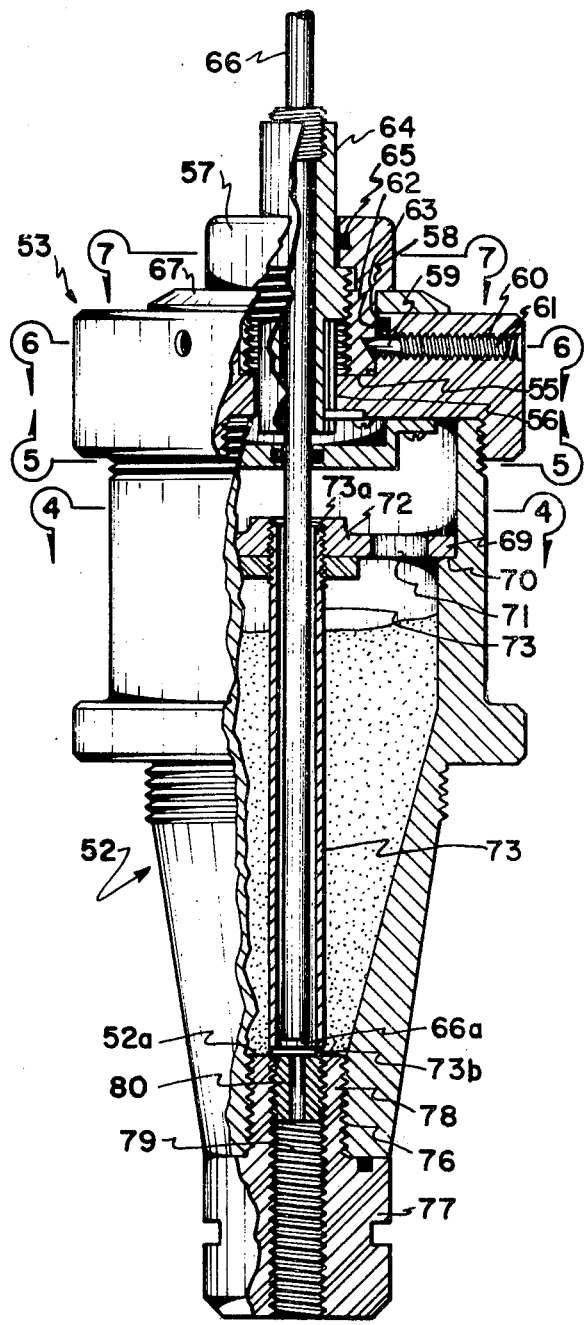
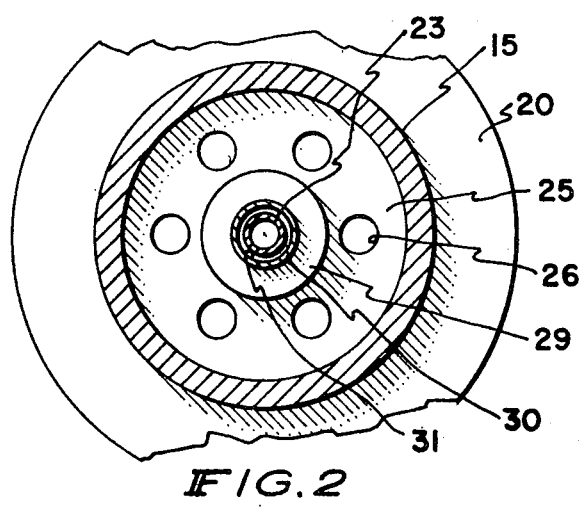
FIG.1
FIG.3
FIG.2
INVENTOR.
Robert G. Coucher
BY
His Attorney INVENTOR.
Robert G. Coucher
BY
His Attorney

POWDER FEEDER AND METHODS FOR TRANSPORTING PARTICULATE MATERIAL

RELATED APPLICATIONS

This application is a continuation-in-part of commonly assigned copending application Ser. No. 140,838, filed May 6, 1971 now abandoned.

BACKGROUND OF THE INVENTION

1. Field:

This invention relates to the transport of finely divided, particulate material from a stockpile at a controlled feed rate. It is specifically directed to methods and apparatus for transporting particulate material at precisely controlled, low feed rates. Specific applications of the apparatus of this invention include the introduction of catalysts or reactants to reaction zones and the supply of metal powder to plasma flame spraying apparatus.

2. State of the Art:

The pneumatic conveying of finely divided, particulate material is conventional. The venturi principle is employed in various commercial equipment for drawing particulate material from a reservoir into a moving stream of gas or liquid. Such techniques have not heretofore been successfully applied to the uniform transport of particulate materials at low rates, however.

Heretofore, for applications requiring uniform feeding of a powdered material, e.g., to a plasma flame for plasma flame spraying of a substrate, various types of mechanical feeders have been relied upon. At very low rates, mechanical feeders become erratic, however. Limitations imposed by the mechanics of such feeders make it impractical to feed powders from a stock at rates much below about a pound per hour. Many potential applications exist for well-controlled, uniform, lower feed rates, but it has not heretofore been practical to achieve them.

U.S. Pat. No. 3,387,110 describes an apparatus for uniform feeding of powder into a plasma spray gun. The apparatus comprises a container with a gas inlet channel opening into its bottom and a powder suction channel at its top, directly opposite the gas inlet channel. A turbulence and suction tube extends down into the container from closed communication with the powder suction channel. In operation, a working gas is introduced through the inlet channel into the container to agitate the powder, the gas causes the powder supply in the container to whirl about within the container and the stirred-up powder is drawn off by suction from the upper part of the container. Proper operation of the device requires the inlet channel to be covered by powder stored within the container. Accordingly, the suction and turbulence tube must terminate a sufficient distance above the bottom of the container to permit powder to flow over the inlet channel. The rate of withdrawal of powder from the container is dependent upon the suction applied at the top of the container and is thus influenced by pressure changes in the plasma. Accordingly, it is not practical to rely upon such a device to deliver particulate matter at a controlled, steady rate to apparatus which experiences periodic or erratic pressure changes.

SUMMARY OF THE INVENTION

The present invention provides novel apparatus and methods for transporting particulate material at a controlled, steady rate. Although the claimed apparatus and method may be modified to effect the transport (or feeding) of particulate materials at high rates, the invention is of particular interest, at the present time, because of its unique capability of transporting such materials at very low rates. The preferred embodiment of the apparatus may be adjusted to deliver particulate material at feed rates ranging from a fraction of a gram up to several pounds per hour.

The apparatus of this invention comprises a vessel having an open interior and provided with a gas inlet at the bottom, a powder outlet at the top, an inner conduit extending down from open communication with the outlet, and an outer conduit defining, with the inner conduit, an annular space isolated from the open interior of the vessel. The vessel is provided with a removable cap or some other suitable means for introducing particulate material to its interior up to a predetermined powder level below the top of the interior of the vessel. The gas inlet at the bottom of the vessel is in the form of an orifice tube or jet oriented to admit gas under pressure in an upwardly directed, high-velocity column, with a high-velocity head sufficient to carry the gas the full height of the vessel and out through the powder outlet at its top. The aforementioned inner and outer conduits are mounted within the vessel in approximately axial alignment with the orifice. The apparatus will function with the vessel vented to the atmosphere, but particulate material is retained better when the vessel is closed except for the aforementioned inlet and outlet.

The outer conduit is mounted with its lower end directly above the orifice and its upper end openly communicating with the interior of the vessel above the aforementioned powder level. The elevation of the lower end of this conduit (or tube) with respect to the bottom of the vessel is an important operating variable; in practice, this variable alone is relied upon to adjust the feed rate of the claimed apparatus. This elevation, the orifice size of the orifice tube, and the gas flow rate through the orifice are the principal control parameters which determine the rate at which a particular material will be transported through the outlet at the top of the vessel. For proper operation, the lower end of the outer conduit is adjusted in elevation to prevent flooding of the space between the lower end of the conduit and the orifice. The elevation required for this purpose is determined by the normal angle of repose of the particulate material and by the distance between the orifice and the outer wall of the outer conduit.

In embodiments scaled to feed powdered material at rates below about a pound per hour, the outer conduit is usually a cylindrical tube of relatively small diameter, typically in the range of about ¼ to about 1 inch. The orifice diameters between about one and about five one-hundredths of an inch are generally useful in such embodiments. The lower end of the outer conduit is normally spaced up from the bottom of the vessel a distance appreciably shorter than the radius of the conduit, often as little as a few thousandths of an inch. Of course, the size and spacings of the orifice and conduits may be varied widely, the foregoing specific values being by way of example only. Proper selection and adjustment of these structures is influenced by the peculiar characteristics of the material being handled and by the extent to which mechanical expedients, e.g., vibration, are relied upon to encourage or discourage flow of the material.

The inner conduit should be of sufficient cross section to receive most of the gas column rising up from the orifice. It should be sufficiently smaller than the outer conduit to define an annular space capable of passing the gas and suspended powder which fails to enter the inner conduit without clogging. Although the apparatus can be made to function with the inner conduit extending to below the outer conduit (and this arrangement is sometimes preferred for high feed rates, when the elevation of the outer conduit is high), the lower end of the inner conduit is normally located in a region within the outer conduit where the flow pattern of the moving gas is substantially laminar. In practice, especially when the apparatus is operated at low feed rates, the lower end of the inner conduit is usually positioned just slightly above the lower end of the outer conduit, typically less than a quarter of an inch. It is possible to terminate the inner conduit at locations higher up the outer conduit, but such a location offers no advantages for steady operation and requires meticulous selection and adjustment.

The walls of the inner conduit may be entirely closed, but when steady (nonpulsing) operation is desired, it is preferred to provide an opening through the wall of the upper conduit near the top of the vessel so that the interior of the inner conduit is in open communication with the upper interior of the vessel. Such an expedient, although not always necessary, ensures continuous steady (i.e., nonpulsing) operation of the apparatus without precisely locating the lower end of the inner conduit. A small aperture, typically less than 5/1000 of an inch in diameter is preferred.

According to some embodiments of the invention, the walls of the inner conduit are closed along the entire length of the conduit, and the gas flow rate and structural parameters (conduit diameters, elevations, etc.) are selected to effect a pulsing mode of operation. It is possible to operate the apparatus of this invention in a pulsing mode whereby discrete unit quantities of particulate material are transported at regular periodic intervals. By properly locating the lower end of the inner conduit, the apparatus may be selectively operated in either a pulsing or a nonpulsing mode.

The apparatus of this invention can be embodied in a variety of forms to practice the claimed method, which generally comprises the following procedures: A working gas is forced through an orifice to establish and maintain a column of gas flowing up from the orifice at high velocity. The orifice is of selected cross section so that the column produced at a given gas flow rate has the desired cross section and velocity head. A stock of the particulate material which it is desired to transport is placed to surround the gas column in the vicinity of the orifice in position to flow toward the orifice. A barrier is placed between the material and the gas column at a selected distance and elevation with respect to the orifice to establish, together with the angle of repose of the particulate material, the extent of advance of the material toward the orifice. The extent of advance may be increased by imparting vibrational energy to the stock of material or by otherwise modifying the normal angle of repose of the material. The pressure differentials caused by the high velocity gas column draw particulate material into suspension in the gas column at a rate determined by the dimensions and velocity of the column and the extent of advance of the material toward the orifice. The velocity head of the gas column transports the suspended material approximately straight up from the orifice. A conduit is placed above the orifice to capture the rising gas column and suspended material and to direct the suspension to a desired remote location. The velocity head of the gas column should thus be sufficient to prevent settlement of the suspended material during transit.

For proper operation, mechanical vibration of the vessel is usually necessary. Vibration is applied to establish and maintain a "stable" angle of repose, and the amount of vibration required for this purpose is a function of the physical characteristics of the material being transported. Some materials, e.g., certain spherical iron powders and free-flowing ceramic materials, require no vibration to stabilize their angles of repose. However, most materials exhibit an appreciable inertial resistance to reassuming their normal angle of repose when a portion of the material is removed from the edge of a stockpile of the material. Sufficient vibration is thus applied to substantially overcome this inertia so that the angle of repose assumed by the material remains essentially constant even though material is continuously or intermittently removed from around the edge of the stockpile. If too much vibration is applied, the angle of repose of the material again becomes unstable.

Ideally, the vibration of the apparatus has very little horizontal component, although if structural considerations dictate less desirable vibrational modes, horizontal vibration is tolerable. Vibration may be at any convenient frequency, with 60 hertz being acceptable for most applications and generally preferred over faster rates. The amplitude of the vibration need not be very great; amplitudes within the range of about 1 to about 5 one-thousandths of an inch are adequate for most purposes. Various apparatus is available or can be constructed to impart vibrational energy to the vessel. The mode of vibration supplied by individual apparatus is generally unique to that apparatus. Nevertheless, the operating range of any such apparatus for maintaining a stable angle of repose for a given material is easily determined by routine scanning techniques.

The amount of vibration useful for establishing and maintaining a stable angle of repose does not result in any appreciable classification of even poorly graded particulate materials. In practice, the vessel may be filled with material and the apparatus operated at varying rates until the vessel is substantially empty without any significant sorting action.

BRIEF DESCRIPTION OF THE DRAWINGS

In the Drawings, which illustrate what is presently regarded as the best mode for carrying out the invention, FIG. 1 is a view in side elevation, partially in section, of one form of the powder feeder of this invention;

FIG. 2 is a view in cross section taken along the line 2—2 of FIG. 1;

FIG. 3 is a view in side elevation, partially in section, of another form of the invention;

DESCRIPTION OF THE ILLUSTRATED EMBODIMENTS

Figure 4:
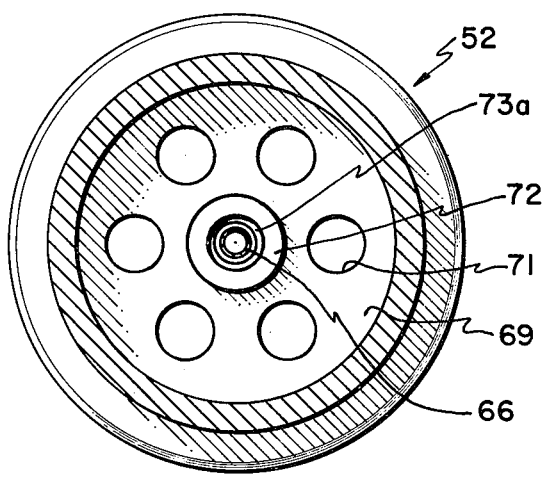
FIGS. 4, 5, 6 and 7 are views in cross section, taken along the lines 4—4, 5—5, 6—6, and 7—7, respectively, of FIG. 3.
Figure 7:
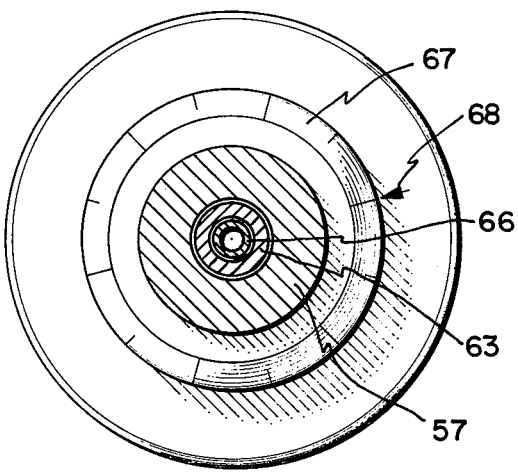
Figure 5:
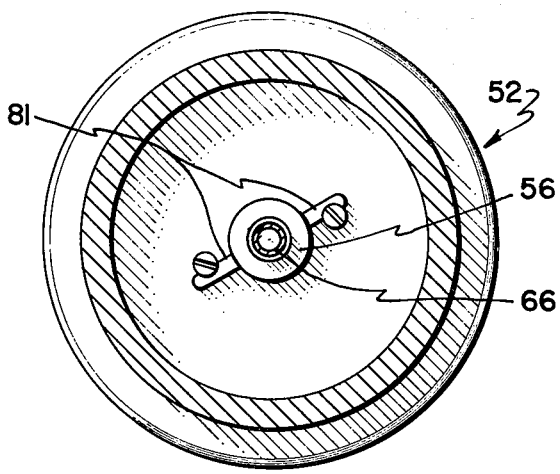
Figure 6:
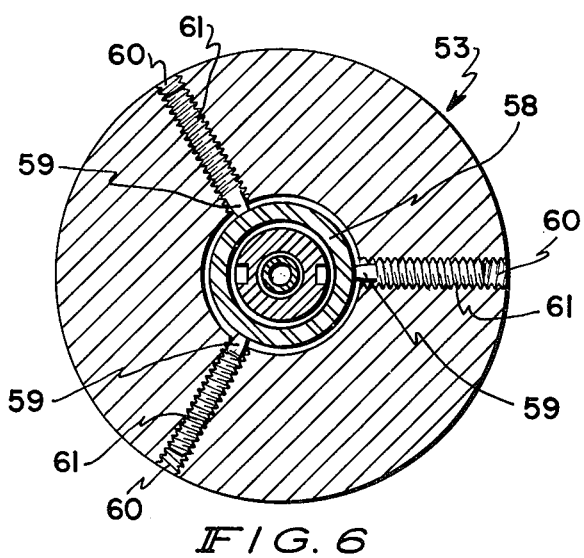

The powder feeder of FIGS. 1 and 2 comprises a closed vessel 11 with an open interior 12. The vessel 11 comprises a casing 13 having a generally frusto-conical portion 14, a top cylindrical portion 15 and a bottom cylindrical portion 16. The open interior 12 of the vessel 11 may be filled with particulate matter, such as metal powder 17, through a removable cap 18. The cylindrical upper casing portion 15 is exteriorly threaded, as shown, to threadedly engage suitable support structure 20.

The cap 18 has a raised boss 21 which includes a bore 22 (powder outlet). A tube 23 is inserted through the bore 22, extending to near the bottom of the interior 12 of the vessel 11. An air-tight seal is formed between the tube 23 and the cap 18 by an O-ring 24*a*, as shown. The location of the lower end 23*a* of the tube 23 may be regulated by manually forcing the tube 23 up or down through the bore 22.

A shoulder 24 between the cylindrical upper portion 15 and the tapered portion 14 bears a support disc 25. The support disc 25 (see FIG. 2) has a plurality of apertures 26 and a centrally disposed boss 27 having a threaded bore 28 therethrough. The shaft 29*a* of a hollow thumb screw 29 threadedly engages the bore 28 so that it may be advanced and retracted axially within the bore 28 by manual rotation. A tube 30 is mounted to extend down as an extension of a bore 31 through the thumb screw 29. The tubes 30 and 23 are approximately concentric and together define an annular chamber 32. This chamber 32 openly communicates with the interior 12 of the vessel 11 above the powder 17 through the apertures 26.

The lower neck portion 16 of casing 14 has a threaded interior bore 33. The bore 33 threadedly engages an orifice collar 34 which has a knurled flange 35.

The bore 36 of collar 34 is threaded, and a gas orifice plug 37, having a small orifice passage 38, is threadedly seated within the collar 34 adjacent the upper end 34*a* thereof. The orifice opening 39 of the plug 37 may be thus advanced toward or withdrawn away from lower end 23*a* of the tube 23 by turning the plug 37 through the bore 36. The illustrated plug 37 is tapered at its forward end 37*a*, and the orifice 39 is in direct axial alignment with the tubes 23 and 30. The outer tube 30 is also spaced above the orifice 39 and upper end 34*a* of the collar 34. The spacing between the lower end 30*a* of the tube 30 and upper end 34*a* of the collar 34 is adjusted by the setting of thumb screw 29 relative to the disc 25.

When the reservoir 12 is filled with finely divided, particulate materials, such as metal powder 17, the particles will gravity-fall, optionally aided by a conventional small vibrator 40. The upper end 34*a* of the collar 34 and the outer tube 30 combine to prevent the particles 17 from covering the orifice 39. The particles 17 will flow toward the orifice 39 to the extent determined by the normal angle of repose of the material (as modified by any vibrational energy which may be applied by the vibrator 40), the diameter of the outer tube 30, the vertical elevation of the outer tube 30 relative to the upper end 34*a* of collar 34, and the extent of advance of the plug 37 through the collar 34.

The space between the lower end 30*a* of the outer tube 30 and the upper end 34*a* of the collar forms a turbulence chamber 41 which is laterally bounded by the metal particles 17. As gas issues under pressure from the orifice 39, a turbulent flow is created, tending to suspend particulate metal in the gas as it flows up the outer tube 30. Any portion of the powder carried by gas flowing up through the annulus 32 (between the tubes 23 and 30) is redeposited on the stock of powder 17 contained within the reservoir 12. As the tube 30 is raised, the quantity of metal particles permitted to flow toward the orifice 39 changes proportionately. The rate at which powder is carried up by the gas is also a function of the rate of gas flow and the diameter of the orifice 39.

The inlet coupling 42 shown has an exteriorly threaded, reduced diameter, male end 42*a* which threadedly engages the bore 36 of the collar 34. The coupling 42 receives a gas supply tube 43, as shown. The tube 43 conducts gas under pressure from any convenient source (not shown) to the plug 37.

In operation of the apparatus 11, metal powder or other particulate matter is placed in the reservoir 12 by removing the cap 18 and pouring the powder through the apertures 26 in the disc 25. Thereafter, the thumb screw 29 may be rotated to adjust the position of the end 3*a* of the outer tube 30 relative to the upper end 34*a* of collar 34. The location of the lower end 23*a* of the tube 23 may also be manually set and adjusted from time to time as desired.

When the cap 18 is replaced, gas is conducted under pressure at a selected, though adjustable, rate through the supply tube 43 to emerge from the orifice 39 as a jet stream, i.e., an upwardly directed gas column of high velocity. The resulting dispersion of metal powder is substantially uniform and may be precisely controlled to deliver particles at an approximately constant rate up through the inner tube 23 and out of the reservoir 12.

The embodiment illustrated in FIGS. 3 through 7 differs from the aforedescribed embodiment in various details of construction, but operates in a generally similar fashion.

The container 52 of this embodiment is threaded at its top, as shown, to releasable secure a cap 53. The cap 53 defines a central stepped bore 55, which terminates at its lower end in a reduced diameter portion 56. The larger diameter portion of stepped bore 55 snugly, though rotatably, receives the lower end of a micrometer dial knob 57. The lower end 58 of the knob 57 is notched to receive a plurality of bullet-nose detents 59. Each detent 59 (see especially FIG. 6) fits loosely within a radial bore 60 of the cap 53 and is integral with a threaded shaft 61. The threaded shaft 61 threadedly engages the bore 60 so that it can be advanced or retracted by use of a suitable tool to secure or remove the knob 57.

An O-ring 62 disposed in a groove 63 maintains an airtight seal between the knob 57 and the cap 53.

A tube retainer 64 is retained by threaded engagement in the cap 53, and is sealed by an O-ring 65 to the dial knob 57, as shown. Rotation of the retainer 64 with respect to the cap 53 is prevented by a pair of keys 81 (FIG. 5). A powder and gas conveying tube 66 is mounted in the tube retainer such that the elevation of its lower end 66*a* is adjustable by varying the threaded relation between the retainer 64 and the knob 57. This adjustment is accomplished by rotation of the dial knob 57. Rotation of the knob 57 moves a dial guage 67 in reference to an index mark 68 (FIG. 7) on top of the cap 53, the gauge 67 being nonrotatably press-fit upon the dial.

A control tube support disc 69 rests upon a shoulder 70 milled into the container 52. The disc 69 has a plurality of radially-spaced apertures 71 and a centrally-disposed boss 72. The boss 72 is internally threaded to engage the threaded exterior top and 73a of an elongated tube 73.

The exact elevation of the lower end 73b of the control tube 73 may be varied by rotating the tube 73 in the boss 72. The gauge 74 (FIG. 4) on the disc 69 may be used in conjunction with the index mark 75 to set or adjust the position of the lower end 73b of the tube 73.

A threaded bore 76 at the bottom of the container 52 receives a plug 77 which includes an upstanding projection 78 which terminates to define the bottom 52a of the container 52. The plug 77 has a central bore 79 through which a working gas may be passed. The bore 79 is threaded to interchangeably receive orifice plugs, such as that illustrated 80, of selected orifice diameter.

Figure 8:
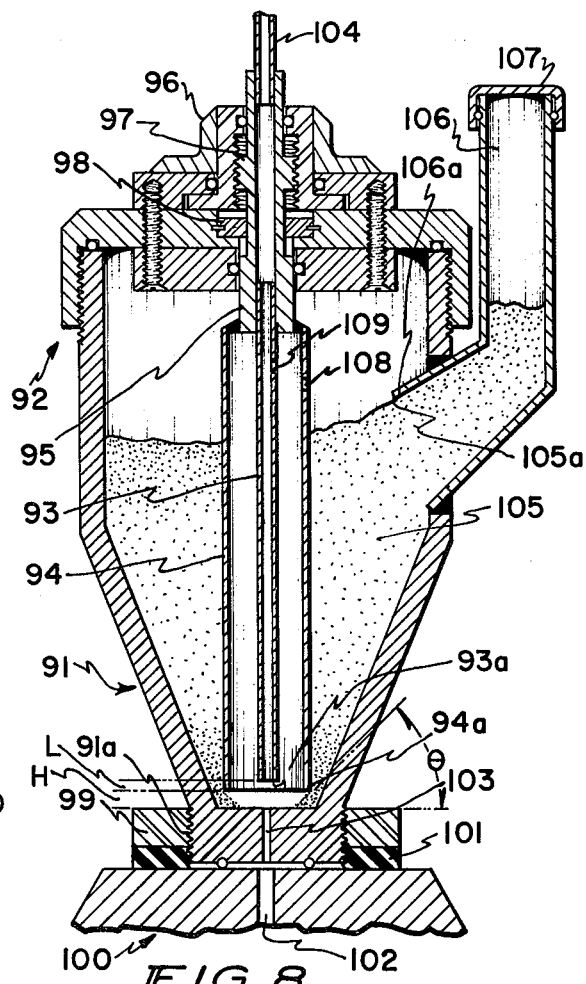
FIG. 8 is a cross sectional view, taken along a plane through the center axis of the presently preferred powder feeder of the invention.

FIG. 8 illustrates an embodiment which is presently preferred, largely because of its simpler construction, but also because of certain features of its design.

The container 91 and cap assembly 92 of this embodiment are similar in construction and operation to the embodiment illustrated by and described in connection with FIGS. 3 through 7, except that the inner conduit 93 and the outer conduit 94 of this embodiment are fixed relative each other and are raised and lowered together by means of a keyed and threaded adjusting stem 95 from which they are suspended. The adjusting stem is raised and lowered by turning a micrometer dial 96, locked as shown to a threaded fitting 97. Rotation of the adjusting stem 95 is prevented by keys 98.

The container 91 is threaded at its base 91a for removable mounting in a base block 99. The base block 99 is mounted on a supply base 100, being separated therefrom by a rubber cushion 101. The supply base includes a gas inlet 102 and may be provided with other auxiliary apparatus, notably a mechanical vibrator (not shown). An orifice channel 103 is milled directly into the bottom 91a of the container 91. As a practical matter, it has been found that suitable control of feed rates for a wide variety of powders can be obtained from a powder feeder of the type shown with an arbitrarily selected small orifice diameter, conduit diameters selected for convenience of construction, and a fixed relative elevation of the inner and outer conduits by merely adjusting gas flow rates and the elevation of the lower end 94a of the outer conduit 94.

The inner conduit 93 openly communicates through the cap 92 by means of the adjusting stem 95 with an outlet 104. Powder 105 is charged as needed to the interior of the container 91 through a port 106 which is normally sealed by a cap 107. The outer conduit 94 openly communicates with the interior of the container 91 through a small hole 108 above the upper powder level 105a, as established by the upper wall 106a of the port 106 which extends into the container 91 as shown. The inner conduit 93 is provided with a small diameter opening 109 through its sidewall to ensure pressure relief and avoid inadvertently operating in a pulsing mode. Although this pressure relief opening 109 is considered a desirable expedient, it is recognized that the operating variables can be adjusted to avoid pulsing. If the opening 109 is omitted, the permissible locations of the bottom 93a of the tube 93 are limited in number and must be more meticulously adjusted.

Figure 9:
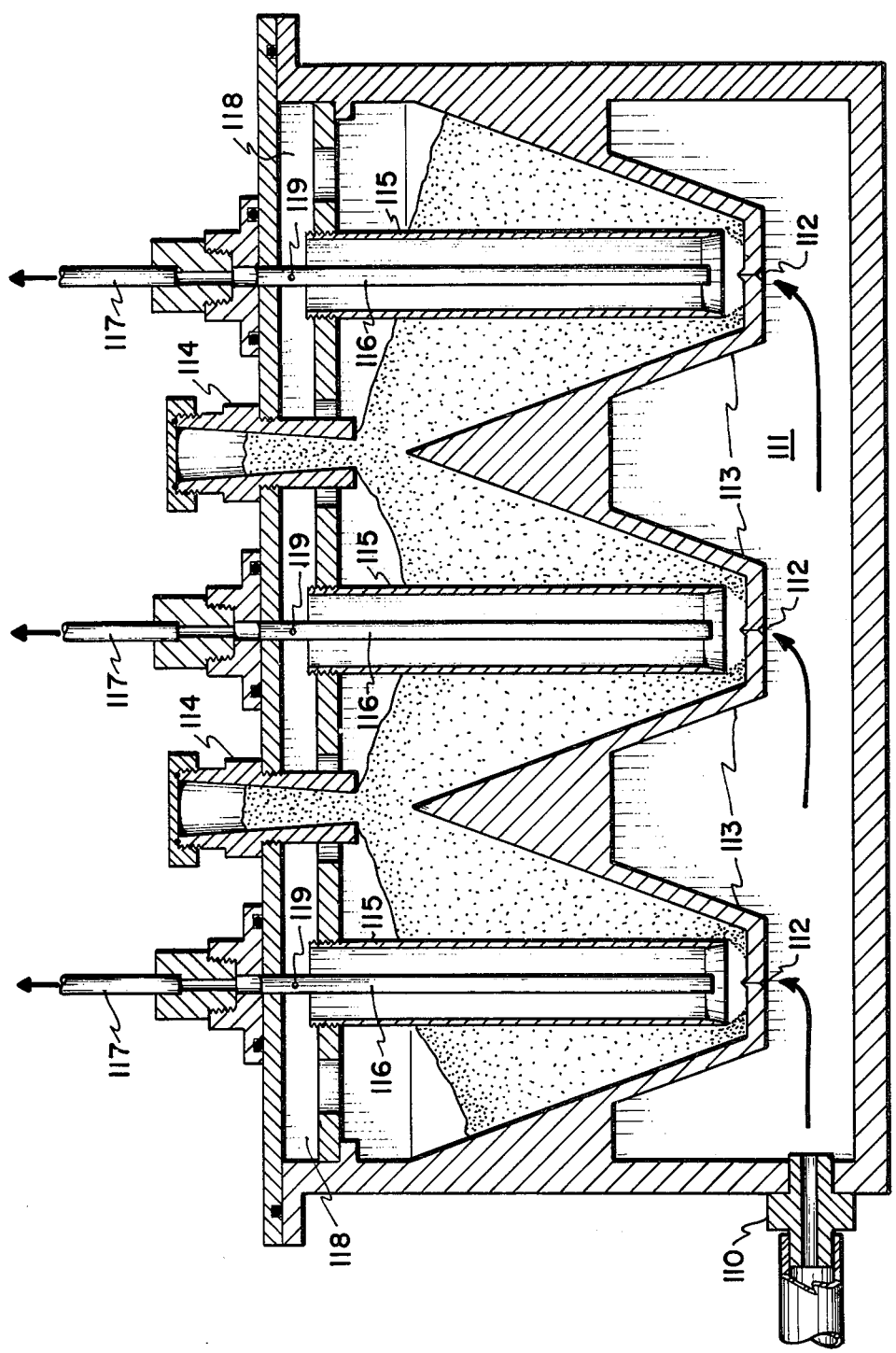
FIG. 9 is a cross sectional view illustrating the invention embodied as a multiple outlet feeder.

FIG. 9 illustrates one way in which this invention may be embodied to supply individually a plurality of devices, such as plasma torch head assemblies. A working gas is introduced through an inlet 110 to a manifold 111 to supply a plurality of orifice channels 112 at the bases of individual powder containers 113. The interiors of the containers 113 openly communicate with each other, and are filled through ports 114 as needed. Barrier tubes 115 are suspended as shown above each orifice channel 112, and are individually adjustable to provide the desired transport rate of powder up the respective inner conduits 116 when the corresponding outlet tubes 117 are opened to gas flow. The barrier tubes 115 are open to the upper interior 118 of the containers 113, and the inner transport tubes 116 are provided with pressure relief apertures 119 as shown.

The following examples are further illustrative of the invention:

EXAMPLE I

A quantity of metal powder was introduced to a powder feeder constructed generally as illustrated by FIG. 8 of the Drawings. In the specific apparatus used in this example, the orifice diameter of the orifice channel 103 was about 1/32 of an inch, the outer conduit 94 had an outside diameter of about 5/8 of an inch and a wall thickness of about 1/32 of an inch, the inner conduit had an inside diameter of about 1/16 of an inch and a wall thickness of about 1/32 of an inch, the difference L between the elevation of the lower end 94a of the outer conduit and the lower end 93a of the inner conduit was about 1/16 of an inch, and the height of the interior of the container 91 was about 4 inches. The aperture 109 in the inner conduit was about 3 one-hundredths of an inch in diameter.

The powder used was an alloy of chrome, nickel and boron with a weight-percent screen analysis of 100 percent −80 mesh, 0.002 percent +100 mesh, 59.1 percent −100+200 mesh, and 40.2 percent −200 mesh. The normal angle of repose of the undisturbed powder was about 27°.

The powder was mechanically vibrated by means of a solenoid mounted in the base 100. The vibration applied had essentially no horizontal component and was held substantially constant with a vertical amplitude of approximately 0.003 of an inch and frequency approximately 60 cycles per second through the test. The power (duty cycle) delivered to the vibrator was adjusted to establish and maintain a stable angle of repose $\theta$. The vertical height H of the lower end 94a of the outer conduit was set at about 1/8 of an inch above the orifice, and nitrogen gas was forced through the orifice at various flow rates. The quantity of powder exiting the feeder through the outlet 104 during successive five minute intervals was measured and recorded. Results are reported in Table 1.

TABLE 1

Grams of powder per five minute interval.

| Interval (5 minutes each) | Nitrogen gas flow rate (STP) in cubic feet per hour | | | | | | |
|---|---|---|---|---|---|---|---|
| | 3.0 | 3.5 | 4.0 | 4.5 | 5.0 | 6.0 | 7.0 |
| 1 | 3.30 | 5.30 | 6.80 | 9.40 | 10.50 | 14.50 | 16.8 |
| 2 | 3.30 | 5.60 | 7.00 | 9.20 | 10.50 | 13.30 | 15.8 |
| 3 | 5.70 | 5.50 | 7.00 | 9.60 | 10.50 | 13.20 | 16.7 |
| 4 | 5.70 | 5.40 | 7.20 | 9.20 | 10.60 | 13.20 | 16.9 |
| 5 | 5.70 | 5.30 | 7.00 | 9.20 | 10.70 | 13.80 | |
| 6 | 3.30 | 5.80 | 7.00 | 9.20 | | 13.20 | |
| 7 | 3.20 | 5.60 | 7.00 | 9.20 | | 13.30 | |
| 8 | 3.30 | 5.60 | 7.00 | 8.90 | | 13.70 | |
| 9 | 3.30 | 5.40 | 6.90 | 9.30 | | 13.70 | |
| 10 | 3.20 | 5.40 | 6.90 | 9.30 | | 13.30 | |
| 11 | 3.30 | 5.90 | 7.10 | 9.10 | | 13.30 | |
| 12 | 3.60 | 5.00 | 6.50 | 9.50 | | | |

EXAMPLE II

The apparatus of Example I was operated at several selected gas flow rates with the height H adjusted to effect selected powder delivery rates. At each of these settings, the differential elevation L between the tube ends 93a and 94a was varied to determine the effect of this parameter on the operation of the feeder. It was found that the value of L may be selected from within a wide range, depending pricipally on the orifice size and range of gas flow rates used. Varying the value of L within the range of about 0 to about ½ inch has no appreciable effect on the efficiency of the feeder of Example I for gas flow rates ranging from below 1 to above 15 cubic feet per hour and corresponding powder delivery rates of about 1/10 to about 30 grams per minute. Apparently, the apparatus could be operated at much higher gas flow rates and much higher transport (powder delivery) rates without modification.

EXAMPLE III

Iron powder with a weight percent screen analysis of 100 percent −100 mesh, 96.5 percent −200 mesh and a normal angle of repose of about 37° was introduced to the powder feeder of Example I. Nitrogen gas was displaced through the orifice at a rate of about 3 cubic feet per hour (STP). No vibration was applied, but all other dimensions and conditions were as reported in Example I, except that the distance H was varied to determine the influence of this parameter on the delivery rate of the powder. Even without any mechanical vibration, the turbulent action of the gas above the orifice established a stable dynamic angle of repose of about 16.7°. Results are reported in Table 2.

TABLE 2

Delivery rate as a function of H (grams per 5 minutes)

| Interval (5 minutes) | H (inches) | | | |
|---|---|---|---|---|
| | .125 | .121 | .118 | .112 |
| 1 | 2.7 | 0.8 | 0.3 | 0.1 |
| 2 | 2.4 | 1.0 | 0.3 | —* |
| 3 | 2.4 | 1.0 | 0.1 | —* |
| 4 | 2.8 | 1.1 | — | —* |
| 5 | 2.8 | 1.0 | — | —* |
| 6 | 2.7 | 1.0 | — | —* |

*The powder feeder was run under these conditions for 140 minutes and delivered powder at an average rate of 0.007 grams per minute (0.035 grams per interval).

EXAMPLE IV

The procedure of Example III was repeated with aluminum powder having a weight percent screen analysis of 0.001 percent +80 mesh, 0.025 percent −80+100 mesh, 41.9 percent −100+200 mesh, and 57.7 percent −200 mesh. The normal angle of repose of this powder was about 32°. With the value of H set at 0.125 inches, 63.5 grams of the material was delivered during a 30 minute test interval.

EXAMPLE V

Several powders, including those of Examples I through III; a mixture of equal weights of $Al_2O_3$ and $TiO_2$ having a screen analysis of 100 percent −200 mesh; carbon powder sized about −100+200 mesh; a copper-nickel-indium composition marketed by Alloy Metals, Inc. under the trademark "AMDRY 500" and having a weight percent screen analysis of 100 percent −44 microns, 1 percent −10 microns; and an activated carbon composition marketed by Atlas Chemical Industries under the trademark "DARCO G-60" and sized 100 percent −½ micron, were transported successfully at various gas flow rates and powder delivery rates from the apparatus of the previous examples. In each instance, it was found that the delivery rate increased approximately linearly as functions of increased gas flow rates, increased vibrational energy and/or increased values of H. Although each of these parameters could be varied over wide ranges, the useful range of variation was dependent on the nature of the material. The useful rnage of each parameter for each material could be determined within a few minutes operation.

EXAMPLE VI

The "AMDRY 500" material of Example V was transported, using the apparatus of the previous Examples and a nitrogen gas flow rate of 3 cubic feet per hour (STP). Vibration was applied as in Example I. The apparatus was run for 12 consecutive 5 minute intervals with the material delivered each interval being measured as follows (grams per 5 minute interval): 6.6, 6.6, 6.9, 6.6, 7.1, 6.8, 6.9, 7.1, 7.0, 7.1, 6.7, and 7.3. The normal angle of repose of the powder was determined to be about 40°. The value of H was set at about 0.262 inches and the value of L was set at about −1/16 of an inch. (That is, the lower end 93a of the inner conduit 93 was lower than the lower end 94a of the outer conduit.)

EXAMPLE VII

The procedure of Example VI was repeated with the "DARCO G-60" material of Example V, using a nitrogen gas flow rate of 12 cubic feet per hour. The flow characteristics of this material were very erratic, and it was not possible to determine a normal angle of repose. After filling the container with powder, mechanical vibration was applied for about ½ hour to settle the powder before gas was introduced through the orifice. The stable dynamic angle of repose was very high, about 68° and the values of H and L were set at about ⅝ and about ¼ inch, respectively. The delivery rates for 15 consecutive 5 minute intervals were (grams per interval): 2.9, 2.9, 2.4, 2.2, 2.0, 2.2, 2.5, 1.6, 2.5, 2.2, 1.8, 2.1, 2.0, 2.0, and 2.1.

Many powders, notably certain starches and carbon powders, have sufficient porosity to permit proper operation of the apparatus of this invention even though the barrier (outer) tube is completely surrounded and covered by the powder. In fact, it has been found desirable to completely fill the vessel with such powders, especially when they are fluffy in character and do not effect a tight seal of the apertures through the outer tube wall. Mechanical vibration of the type disclosed in Example VII can be used to advantage to fill the container to at least near its top, even though the powder is fed into a lower portion of the interior of the container as shown in FIG. 8. In practice, such mechanical vibration causes the powder level to rise up above the inlet level. Thereafter, the apparatus can be operated for prolonged periods without further stabilization procedures. The upper end of the barrier tube is in open communication with the interior of the vessel through the powder.

The normal mode of operation of the powder feeders of this invention involves providing powder access to the entire perimeter of a rising gas column. This mode of operation is generally the most convenient and efficient, but it is recognized that the transport mechanism of this invention is operable in other modes. For example, powder access to the gas column can be blocked or screened along a substantial segment of the perimeter of the gas column. Such embodiments are fully operable and could prove to be advantageous for certain specialized applications.

Reference herein to details of certain preferred embodiments is not intended to restrict the scope of the claims, which themselves recite the features regarded as essential to the invention. For example, it is recognized that the apparatus disclosed herein would undergo considerable modification when scaled up to transport material at very large rates. Such modifications are well within the skill of those familiar with scale theory.

I claim:
1. Apparatus comprising:
   a closed vessel with an interior;
   means for introducing particulate material to the interior of said vessel;
   an orifice, opening into the vessel from its bottom, oriented to admit gas forced therethrough in an upwardly directed jet stream into the interior of said vessel;
   an outlet at the top of said vessel;
   a first conduit, mounted within the vessel in approximately axial alignment with said orifice, with the lower end of said first conduit directly above said orifice and sufficiently near the bottom of the vessel to prevent powder contained within the vessel from filling the space between said lower end and said orifice, and with the upper end of said first conduit in open communication with the interior of said vessel; and
   a second conduit of smaller cross section than said first conduit mounted within and concentric with and in approximately axial alignment with said first conduit with the lower end of said second conduit directly above said orifice and the upper end of said second conduit openly communicating with said outlet.

2. Apparatus according to claim 1, including means for adjusting the elevation of the lower end of said first conduit with respect to the bottom of said vessel.

3. Apparatus according to claim 1, wherein said orifice is contained in a removable orifice plug, and including a plurality of interchangeable said orifice plugs.

4. Apparatus according to claim 1, including means for adjusting the elevation of the lower end of the second conduit with respect to the lower end of the first conduit.

5. Apparatus according to claim 1, wherein the first and second conduits are approximately concentrically arranged cylinders suspended from the top of the vessel by a common means for adjusting the elevation of their lower ends with respect to the bottom of the vessel.

6. Apparatus according to claim 1, including means for vibrating said vessel.

7. Apparatus according to claim 6, wherein said second conduit is provided with an aperture through its wall near its upper end and the lower end of said second conduit is positioned within a region of substantially laminar gas flow.

8. Apparatus according to claim 1, including means for maintaining the pressure at the upper interior of the vessel approximately equal to the pressure in the upper end of said second conduit in response to the tendency of the pressure at the top of said vessel to become lower than the pressure at the top of said second conduit during operation.

9. Apparatus according to claim 8, wherein said means is associated with said second conduit and is operational to permit gas flow from the interior of said conduit to the open interior of said vessel.

10. Apparatus according to claim 9, wherein said means is an opening through the wall of said second conduit.

* * * * *